Patented June 22, 1937

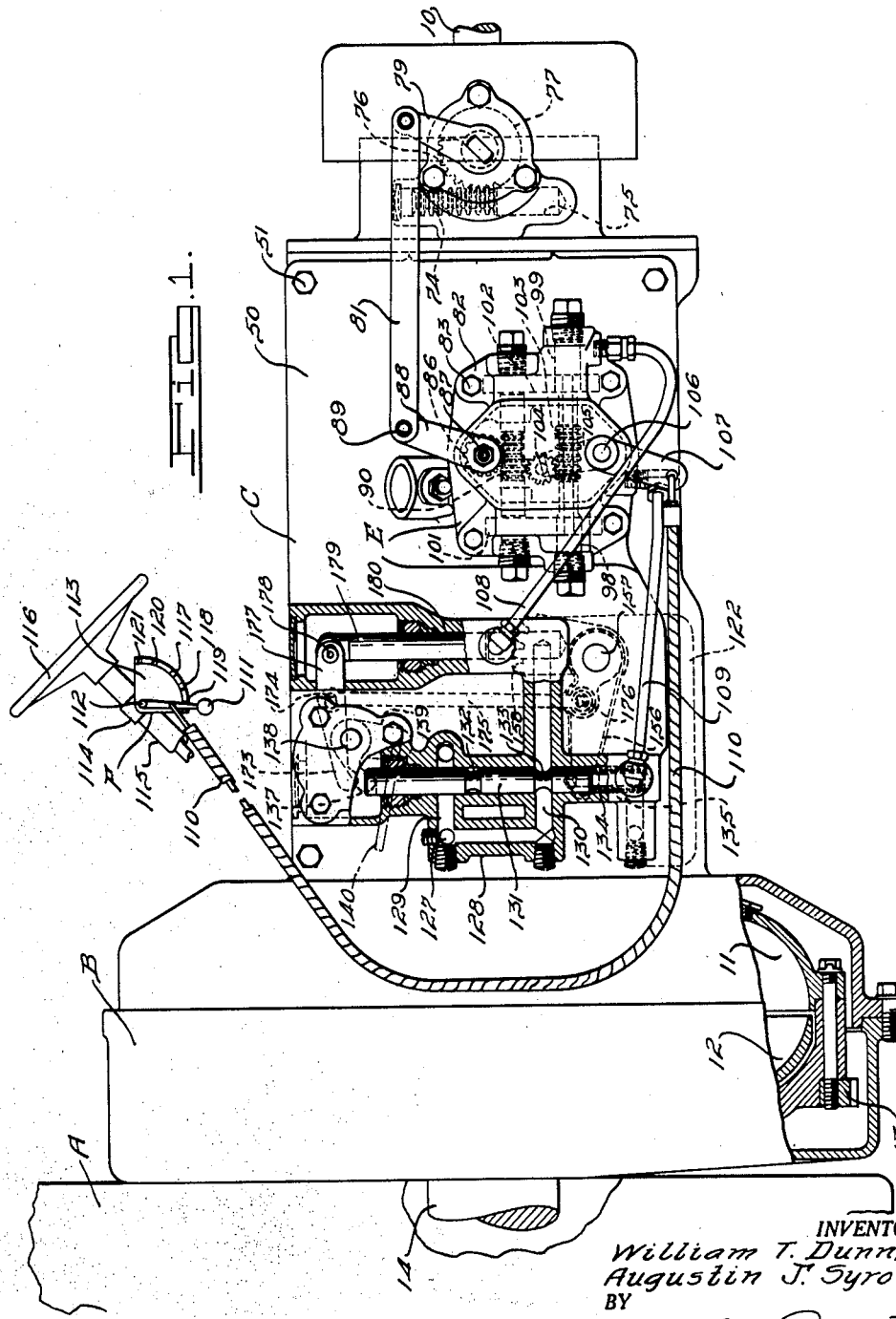

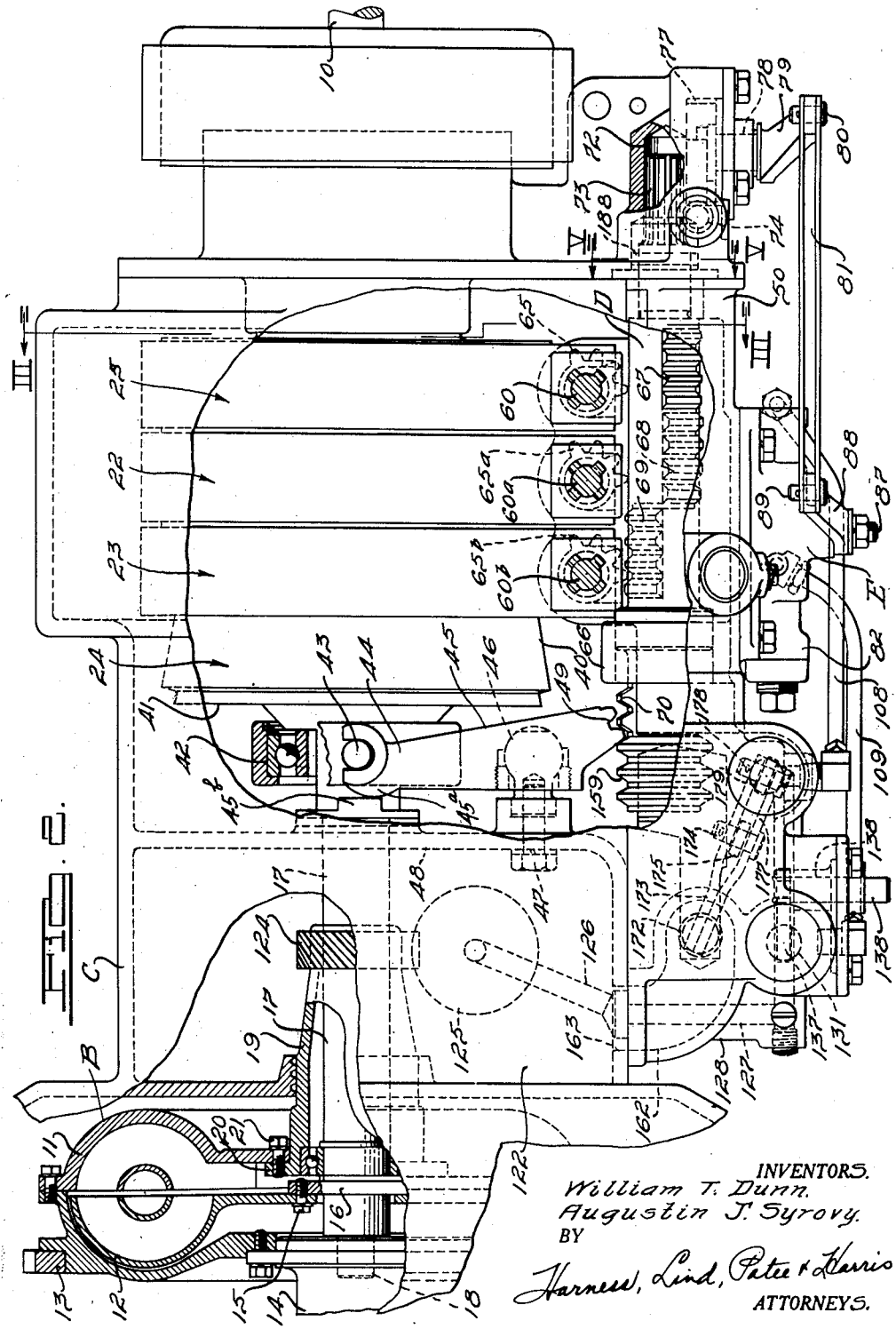

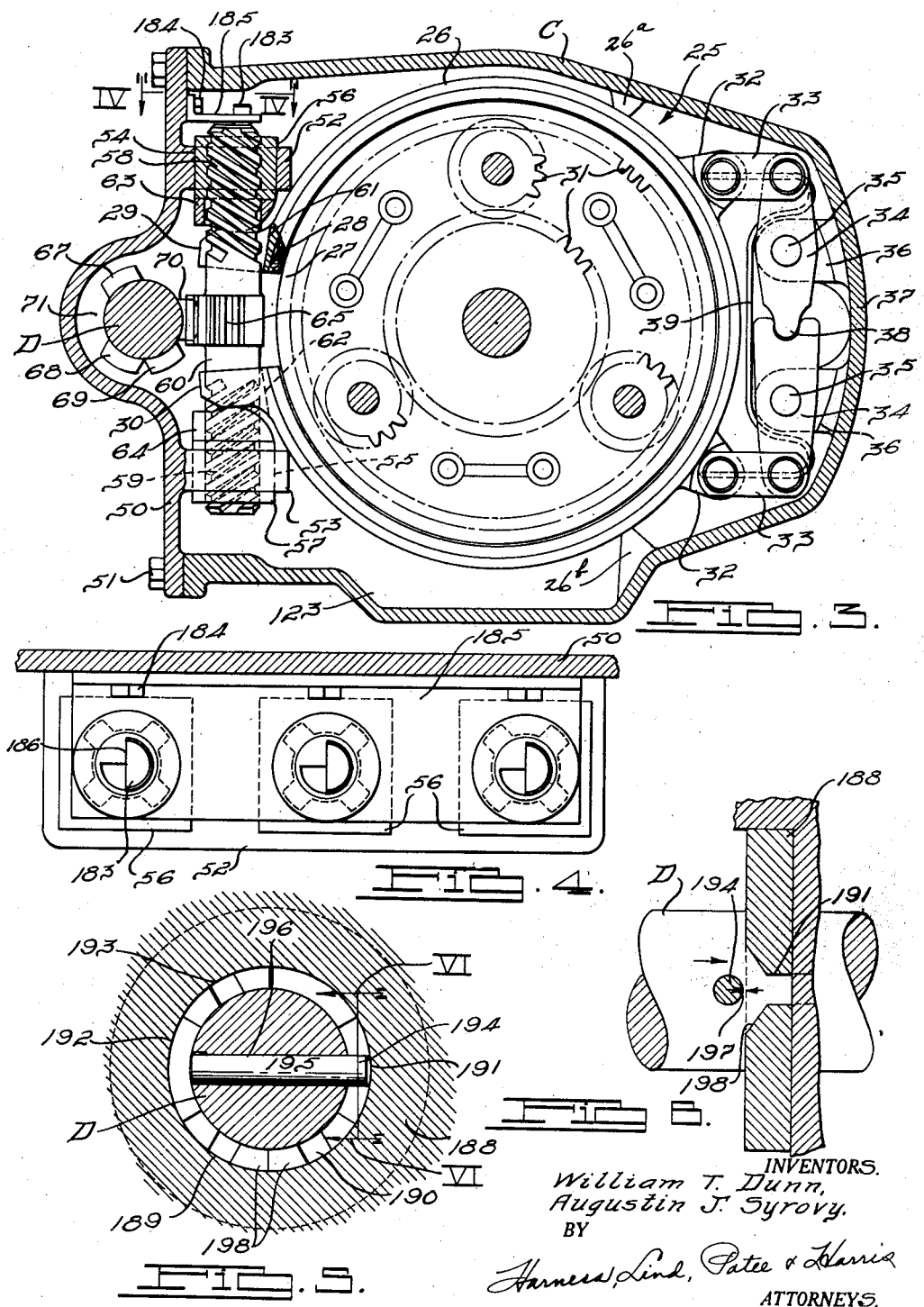

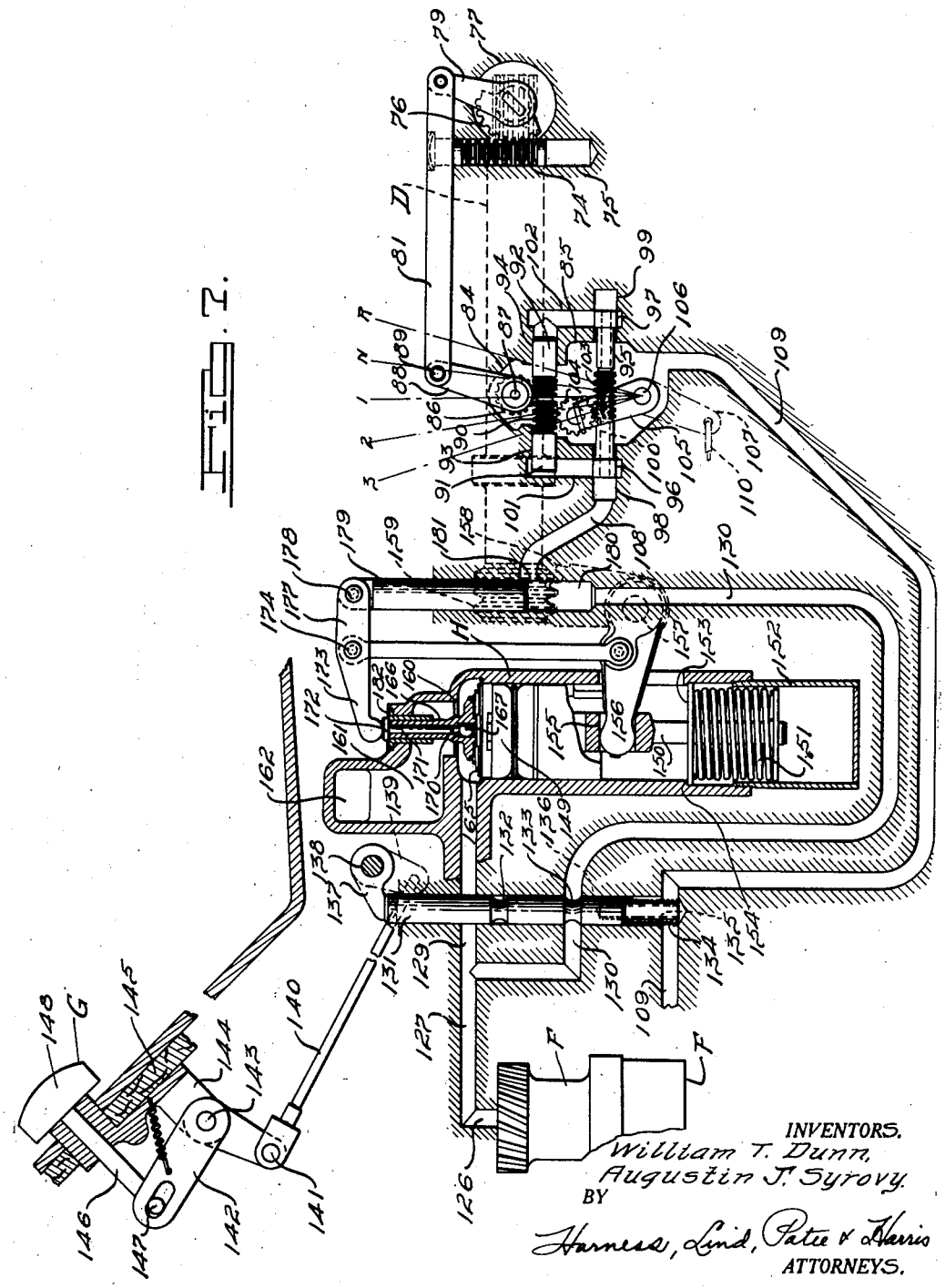

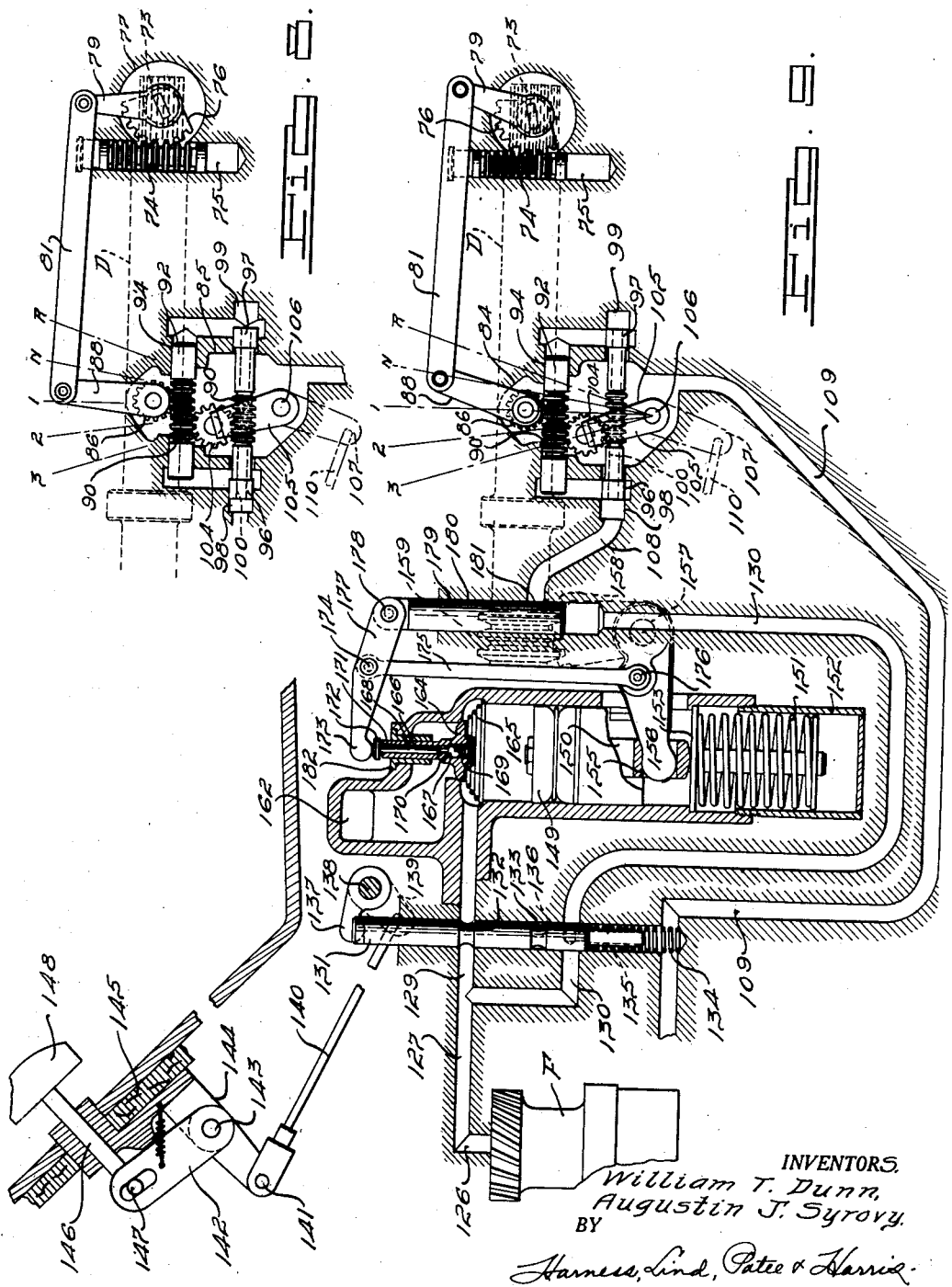

2,084,578

UNITED STATES PATENT OFFICE 2,084,578

MOTOR VEHICLE POWER TRANSMISSION

William T. Dunn and Augustin J. Syrovy, Detroit, Mich., assignors to Chrysler Corporation, Detroit, Mich., a corporation of Delaware Application May 7, 1934, Serial No. 724,434

40 Claims. (Cl. 74—262)

This invention relates to power transmission devices and refers more particularly to improvements in power transmission devices or systems especially adapted for use in connection with motor vehicles, although not necessarily limited thereto.

Our invention, in certain more limited aspects thereof, provides improvements in the drive and control for power transmission systems of the type including the well-known epicyclic or planetary transmission gear box. With such planetary transmissions, it is customary to arrange the gearing to provide for the desired number of speed ratios between the engine and vehicle driving ground wheels and such gearing is customarily selected and controlled to obtain the desired speed ratio by actuation of any one of a group of transmission gearing controlling clutches usually consisting of reaction brake bands associated with and controlling the rotation of corresponding drums or similar elements of the various planetary gear trains.

One object of our invention resides in the provision of an improved selector and actuating mechanism for obtaining the several speed ratios provided by the transmission or other speed changing mechanism, the latter preferably being of the planetary gear type although not necessarily limited thereto in the broader aspects of our invention.

A further object of our invention resides in the provision of improved controls and actuating mechanism for selecting and manipulating the various gear trains of a transmission, particularly a planetary type of transmission, whereby means is provided responsive to manual control for automatically bringing about a complete cycle of gear ratio change. Thus, in one embodiment of our invention we have provided fluid pressure actuating means responsive to operation of manual control for first releasing the rotary drum of one of the planetary gear trains and then braking another drum associated with the transmission for establishing a further gear ratio drive for the motor vehicle.

In carrying out the above objects of our invention, we have provided a common actuator or prime mover which may be of the fluid pressure type for applying the necessary force to the braking devices in order to control the rotation of the desired drum of the planetary gearing, a selector mechanism being provided under manual control of the vehicle driver for selectively causing the common actuator to apply a braking force to the proper drum. This actuator may be of the fluid pressure type adapted for operation by oil pressure, air pressure either above or below atmospheric pressure, or other equivalent systems. We prefer, according to the teachings of this phase of our invention, to provide for energizing the actuator by oil pressure.

A further object of our invention resides in the provision of an improved selector mechanism for use with speed ratio changing mechanisms of the character aforesaid. In one embodiment of our invention this selector mechanism may be operated by fluid pressure under manual adjustment or control, the mechanism further including a novel preselecting means for adjusting the selector mechanism prior to actuation thereof in effecting a speed ratio change in the driving mechanism.

A further object of our invention is to provide improved selector means incorporating a fluid pressure controlling leader valve adapted for manual adjustment by the vehicle operator.

Another object of our invention resides in the provision of improved means for applying the braking force selectively to the various braking devices of the planetary gear trains, this means including a shaft or other operating element adapted for rotary selective adjustment and for reciprocating movement to release and actuate the various braking devices. According to our preferred embodiment, this shaft is formed with a plurality of circumferentially and longitudinally spaced sets of rack-like teeth respectively adapted for actuating the braking devices.

A further feature of our invention resides in the provision of improved means, preferably in the form of an oppositely threaded screw, associated with each of the breaking devices and cooperating with the aforesaid operating shaft to actuate the breaking devices.

Another object of our invention is to provide an improved preselector arrangement and mechanism operated thereby whereby the vehicle driver may manually select for the desired transmission speed ratio in advance of the speed ratio change, the change in speed ratio preferably occurring, according to this phase of our invention, in response to operation of a further manually controlled device such as a foot pedal, for example.

An additional object of our invention resides in the provision of improved fluid pressure operating means to furnish the necessary power to operate the several speed ratio controlling devices or braking means in the case of a planetary transmission. This power actuating means is preferably arranged to release the aforesaid speed ratio controlling devices and also to actuate these devices, although, if desired, other prime mover means may be provided for either the release or the actuation within the broader aspects of our invention.

A still further object of our invention resides in the provision of improved fluid pressure means for actuating the various transmission controlling devices, this means including means associated with the main pressure cylinder and operating to reduce the amount of fluid necessary to be pumped to the cylinder to cause actuation of the transmission mechanism and also to effect a very rapid transmission gear change in response to operation of the manual control.

A planetary type of transmission presents a number of advantages over the more conventional sliding gear types of transmissions, and our invention is therefore primarily directed toward planetary types of transmissions and power transmission systems employing planetary gearing speed ratio controlling devices although, as aforesaid, the fundamental principles of our invention may, if desired, be employed in connection with transmissions of other types including the aforesaid sliding gear types of transmissions. By way of example in connection with the aforesaid advantages of the planetary transmission over more conventional types, it may be noted that the planetary transmission permits gear changes without the necessity of releasing the main clutch between the engine and transmission so as to obtain relatively quick gear changes and faster acceleration of the motor vehicle. This is made possible by reason of the fact that the braking devices associated with the planetary gear trains are, in effect, clutches in that each rotary drum controlling a planetary gear train is frictionally engaged by its associated braking means.

Further objects and advantages of our invention will be apparent from the following detailed description of one illustrative embodiment of the principles of our invention, reference being had to the accompanying drawings, in which;

Fig. 1 is a side elevational view illustrating our power transmission mechanism as a whole, a portion of the clutch casing being broken away to illustrate the main clutch parts, certain parts of the transmission controlling devices being illustrated in cross section.

Fig. 2 is a plan view of the mechanism shown in Fig. 1, portions of the transmission casing being broken away to illustrate the speed ratio gear train controls.

Fig. 3 is a sectional elevational view through the transmission illustrating one of the speed ratio controlling devices and parts associated therewith, the section being taken along the line III—III of Fig. 2.

Fig. 4 is a sectional plan view showing the alignment controlling means associated with the ends of the band operating screws, the section being taken along the line IV—IV of Fig. 3.

Fig. 5 is a detail sectional elevational view illustrating the aligning means for the brake operating rack, the section being taken along the line V—V of Fig. 2.

Fig. 6 is a further view in cross section of the rack aligning means shown in Fig. 5, the section being taken along the line VI—VI of Fig. 5.

Fig. 7 is a diagrammatic sectional elevational view of the transmission controlling and actuating mechanism, the parts being illustrated in their positions occupied during the cycle of speed ratio change.

Fig. 8 is a detail view of the valve controlled selector mechanism shown in Fig. 7, the parts being shown in their positions of manual adjustment prior to the start of the power operated cycle of gear ratio change.

Fig. 9 is a view corresponding to Fig. 7 but showing the parts positioned at the completion of the cycle of gear ratio change.

Referring to the drawings, we have illustrated our invention in connection with a motor vehicle drive, this drive including a prime mover or engine A, a portion of which is shown in Fig. 1, a main clutch B driven from the engine and a change speed transmission or gear box C driven from the clutch B. The drive passes from the transmission through a power take-off shaft 10 which, as usual, may extend rearwardly of the vehicle to drive the usual ground wheels (not shown).

The clutch B may be of any suitable construction for controlling the drive between engine A and transmission C, this clutch being illustrated in Figs. 1 and 2 in the form of a fluid type having the usual driving and driven cooperating vane members 11 and 12, respectively. The driving vane member 11 is carried by the engine flywheel 13, the latter being connected as usual with the rear end of the engine crankshaft 14. The driven vane member 12 is connected at 15 to a flange 16 of the driven shaft 17, this shaft having a forward extension 18 piloted in the rear end of the crankshaft 14. The driven shaft 17 extends rearwardly to drive the power take-off shaft 10 through the intermediary of the various gear trains of transmission C.

Where the power means for operating the transmission is afforded by a fluid such as oil under pressure, the pump for placing the oil under pressure is preferably operated from the engine so as to maintain the fluid pressure even when the engine is idling. It is, therefore, preferred to provide a pump drive from the driving clutch member 11 rather than the driven clutch member 12 inasmuch as the latter may be stationary under certain conditions of vehicle operation such as when the vehicle is standing still with the engine idling.

This drive may be provided by reason of a driving sleeve or hollow shaft 19 mounted on the shaft 17 but rotatable independently thereof. The sleeve 19 has a hub or flange 20 connected at 21 with the driving vane member 11 of the clutch so that even when the driven vane member 12 is not being operated from the driving member 11, the sleeve 19 will be rotatably driven with the engine crankshaft 14 and flywheel 13. The pump drive from sleeve 19 will be more apparent hereinafter.

We have illustrated a fluid type of clutch B since a clutch of this character has a number of advantages in connection with a transmission of the planetary gear type C. Thus, the fluid type of clutch is desirable in providing a smooth drive for the vehicle through the planetary transmission, relatively high power driving efficiency, automatic release of the drive between the engine and transmission when the engine is idling and with the transmission manipulated to establish one of its driving gear ratio settings, and other well-known favorable characteristics. We desire to point out that other types of clutches may be employed to control the drive between engine A and transmission C if desired. For example, the well-known type of friction clutch may be employed and may be manually operated or automatically operated by the well-known commercial type of vacuum clutch releasing mechanism as will be readily understood.

We have illustrated the change speed transmission C as the epicyclic or planetary type, this general form of transmission being well-known in the art and, as usual, includes a plurality of transmission speed ratio controlling clutches or brakes 22, 23, 24, and 25, these braking devices being respectively adapted to actuate the transmission in its first speed ratio or low gear, second speed ratio or intermediate gear, third speed ratio or direct drive, and reverse drive.

The typical brake device 25 illustrated in Fig. 3 consists of an outer band 26 which substantially surrounds the drum 27, the band being provided with friction braking material 28 carried by the band and adapted for frictional engagement with drum 27. The band 26 has its ends formed with laterally projecting actuating flanges 29 and 30 positioned adjacent each other, means being provided to move the band ends toward each other to contract the band 26 for causing the friction material 28 to brake rotary drum 27, the band having sufficient inherent resilience to expand away from contact with the drum when the actuating means is relieved at the flanged ends 29 and 30. In Fig. 3 the reverse speed ratio braking device 25 is illustrated in its inoperative position whereby the drum 27 is free to rotate through operation of the planetary gear set 31 somewhat diagrammatically illustrated in association with the drum 27. When the braking device 25 is actuated by contracting the band 26, the drum 27 is held against rotation, the driven shaft 10 in such instance being operated through the planetary gearing 31 to provide the reverse drive for the motor vehicle.

In order to anchor the band 26 and to substantially equalize the braking forces applied to drum 27 around the periphery thereof so as to substantially avoid a tendency toward lateral loading of the drum and planetary gearing transverse to the axis of the drum, we have provided the band with a circumferentially spaced pair of anchoring flanges 32. The flanges 32 are connected through links 33 with the levers 34 pivotally mounted at 35 with the supporting brackets 36 of the transmission casing 37, the levers 34 being interlocked at 38 so that movement of one of the flanges 32 will be transmitted through the pivotal levers 34 and the links 33 to the other portion of the band associated with the anchoring device. The links 33 are thus pivotally connected at their opposite ends respectively with the anchors 32 and levers 34. In order to maintain a yielding tension in the links and levers to prevent their rattling and also to exert a yielding expanding action on band 26, we have provided a ribbon-like spring 39 which passes over the brackets 36 and which has its opposite end anchored to the pivots at the opposite ends of the links 33.

In order to support the brake band assembly as a whole and to limit outward expansion of the brake band, we have provided the lugs or stops 26$^a$, 26$^b$ which project inwardly of the transmission casing as shown in Fig. 3.

The third speed braking device 24 is arranged for a direct drive through the transmission and differs somewhat from the braking devices 22, 23, and 25 in that the braking device 24 has its rotary element or drum 40 of the cone type adapted for clutching or braking action by frictional engagement with an axially movable cone clutch member 41. This cone member 41 is adjustable by a collar 42 having pins 43 engaged by the yoked end 44 of an actuating lever 45 pivotally mounted by the ball and socket structure 46 secured by a fastener 47 to the transmission tranverse housing or casing 48. The opposite end of lever 45 is formed with gear teeth 49, the purpose of which will presently be more apparent. Forward movement of the cone clutch member 41 is limited by engagement of the lever shoulder 45$^a$ with a fixed stop 45$^b$ as shown in Fig. 2.

The transmission C has an opening longitudinally along one side thereof, this opening being closed by a removable casing cover 50 removably secured to the transmission through suitable fasteners 51 as best shown in Fig. 3. The cover 50 is provided with the vertically spaced inwardly extending supporting brackets 52 and 53, these brackets being formed with co-axial openings 54 and 55, respectively. Splined within the openings 54 and 55 are the nuts 56 and 57 and these nuts in turn are axially and oppositely threaded to receive the threaded ends 58 and 59 of an operating oscillatory shaft or screw 60.

The shaft 60 extends through openings 61 and 62 respectively formed in the band flanges 29 and 30, these openings preferably having considerable clearance with shaft 60 so as not to bind on the shaft when the band is contracted and expanded. In order to transmit the thrust of the nuts 52 and 53 to the flanges 29 and 30, we have provided the intermediate washers 63 and 64, these washers having a lower rounded face engaging the edge of the respective openings 61 and 62 so as to facilitate the operation of the band movement and relieve distorting loads at the threaded portions of shaft 60 during the operation of the band.

The operating shaft 60 of the reverse braking device 25 has its portion thereof intermediate the band ends 29 and 30 formed with an arcuate portion of a gear, the gear teeth being designated at 65, the means for oscillating the shaft 60 through the teeth 65 being more particularly hereinafter described.

In operation of the reverse speed controlling device or brake 25 as thus far described, it will be apparent that when the shaft 60 is given a rotary movement, such movement operates through the oppositely threaded ends of the shaft to cause the nuts 56 and 57 to move inwardly toward each other in their splined openings 54 and 55 respectively, this movement acting through washers 63 and 64 to contract the band ends 29 and 30 whereby the reverse drum 27 has its rotation checked for establishing the reverse drive through the transmission. When the shaft 60 is rotated in the opposite direction the nuts 56 and 57 are moved away from each other and the band 26 is expanded to permit the drum 27 to again rotate and thereby relieve the drive through the transmission controlling device 25.

In order to avoid repetition, we have not illustrated all of the details of the brake operating means associated with the controlling devices 22 and 23, it being understood that this operating means is similar to that described in connection with the controlling device 25. For convenience of reference the operating shaft or screw for the first speed braking device is designated as 60$^a$ and the corresponding shaft for the second speed braking device 23 is designated as 60$^b$ as best shown in Fig. 2. The segmental gear teeth associated with these shafts is respectively designated as 65ᵃ and 65ᵇ. As will be more apparent presently the teeth 65, 65ᵃ, 65ᵇ and 49 are adapted to be selectively operated in order to selectively control the engagement and release of the respective speed ratio controlling devices 25, 22, 23, and 24.

We will next describe the common operating means or actuating element which is adapted for selective engagement under manual control with the aforesaid gear segments 65, 65ᵃ, 65ᵇ, and 49 for respectively operating the speed ratio controlling devices 25, 22, 23, and 24 and also for establishing a neutral condition in the transmission.

Referring now particularly to Figs. 2 and 3 the removable transmission side cover 50 is provided with a plurality of suitable bearings one of which is shown at 66 in Fig. 2 for receiving the reciprocating and oscillating rack or actuating shaft D.

This actuating shaft D has a series of teeth forming a rack adapted to be brought into operative association with each of the gear segments, these racks being designated at 67, 68, 69, and 70. From Figs. 2 and 3 it will be noted that the racks are longitudinally spaced along the shaft D and that they are also spaced circumferentially of the shaft whereby upon progressive rotation of the shaft only one of the racks will engage its associated gear segment at any time. In Figs. 2 and 3 it will be noted that the shaft D is positioned so that the third speed rack 70 is in position for operating the third speed gear segment 49 and when the shaft D is moved to the left as viewed in Fig. 2 the lever 45 will be rocked on its pivot 46 to move the third speed cone clutch member 41 into engagement with the third speed drum 40 and to thereby arrest rotation of drum 49 and cause the drive to take place through the transmission in the third gear ratio or direct drive. It will furthermore be noted that with the third speed rack 70 in the position illustrated, the remaining racks 67, 68, and 69 are free from engagement with their respective associated gear segments 65, 65ᵃ, and 65ᵇ. From Fig. 3 it will be noted that the shaft D has a space 71 longitudinally between the reverse rack 67 and the first speed rack 68, this space being designated as the neutral space so that when the shaft is positioned with the space 71 facing the gear segments (when shaft D is rotated 180° from the position illustrated in Fig. 3) each of the racks will be free from contact with its associated gear segment and the transmission will be in neutral at which time the various braking devices 22, 23, 24, and 25 are released.

In order to selectively rotate the shaft D for selectively engaging the racks thereof with the respective gear segments and also for axially operating the shaft in the various positions of selective adjustment, the following mechanism is provided. The rear end of shaft D is slidably supported in a cylindrical guide 72, the shaft end having gear teeth 73 formed thereon and engaging a circular rack 74. The rack 74 is guided for vertical movement by a cylindrical guide 75 having an opening in its rear wall to receive the quadrant gear 76.

The gear 76 as best shown in Fig. 7 operates in a housing 77, the gear being fixed to a shaft 78 (see Fig. 2) which extends outwardly to receive the lower end of a lever 79. The lever 79 is suitably secured to shaft 78 so that these parts do not have relative movement, the upper end of lever 79 being pivotally connected by a pin 80 to the rear end of a link 81.

When the link 81 is moved so as to swing the lever 79 about its pivot provided by shaft 78, the quadrant gear 76 will also be rotated to move the rack 74 in the cylindrical guide 75. Reciprocating movement of rack 74 causes rotary movement of shaft D by reason of the gear teeth 73, it being apparent that by suitable adjustment of lever 79 the various racks 67, 68, 69 and 70 may be selectively rotated into engagement with the corresponding segmental gears 65, 65ᵃ, 65ᵇ, and 49. It will also be apparent that in any position of selective rotary adjustment of the shaft D, this shaft may be moved axially by a mechanism which will be presently described, the gear teeth 73 sliding along the rack 74.

We have provided fluid pressure operated means for selectively adjusting lever 79, this adjusting means as best shown in Figs. 1, 7, and 8 comprising a leader valve mechanism E and the manual controls F and G.

The leader valve mechanism E is carried in a casting 82 suitably secured by the fasteners 83 to the transmission cover 50. The casting 83 has upper and lower communicating spaces or chambers 84 and 85, respectively, the chamber 84 receiving a gear 86 rotatably supported on a shaft 87 to which is non-rotatably secured a lever 88, this lever projecting upwardly from the outside of the casting 82 as shown in Fig. 2. The upper end of lever 88 is pivotally connected by a pin 89 to the forwardly extending end of the aforesaid link 81 from which it will be apparent that rotation of gear 86 will swing the lever 88 about the center of shaft 87, the link 81 causing a corresponding swinging movement of lever 79.

Engaging the gear 86 is a rack 90 disposed intermediate the openings 84 and 85. This rack is formed with piston portions 91 and 92 at its opposite ends, these piston portions being slidably guided in the co-axial cylinders 93 and 94.

Operating below the rack 90 is a leader valve 95 formed with end piston valve portions 96 and 97 respectively slidable in the cylindrical guides 98 and 99. The valve 95 has a passage 100 extending axially therethrough, the cylindrical valve guides 98 and 99 thus being in communication through the leader valve 95. The cylinders 93 and 98 are in communication by a vertical passage 101 and a similar passage 102 which places the cylinders 94 and 99 in communication.

The leader valve 95 is formed with an intermediate rack portion 103 engaged by a gear 104, this gear also meshing with the teeth of rack 90. The gear 104 is mounted on the upper end of a lever 105 pivoted at 106. A second lever 107 extends downwardly from the pivot 106, levers 105 and 107 being secured together against their relative rotation. The gear 104 is suitably journaled on lever 105 so that as the lever is rotated about its pivot 106 the gear 104 will follow the lever movement, it being understood that the gear axis will move a small amount axially of lever 105 during the swinging movement of the lever inasmuch as the gear 104 is constrained against orbital movement about the pivot 106 by reason of its engagement between the racks 90 and 103.

The cylinder 98 is in communication with a conduit 108 through which a suitable fluid such as oil under pressure is supplied to the cylinder, the chamber 85 opening downwardly to a conduit 109 for returning the fluid to the oil reservoir or sump as will be presently apparent.

Connected to the downwardly extending end of lever 107 is a suitable linkage such as a Bowden wire mechanism 110 which, as best shown in Fig. 1, extends to a point for convenient manipulation by the motor vehicle driver. In Fig. 1 we have shown the Bowden wire as extending from the lever 107 for connection to a manually adjustable selector arm or lever 111 pivotally mounted at 112 to a selector segment 113, this segment being securely mounted by a bracket 114 to the usual steering post 115 carrying the vehicle steering wheel 116. The segment 113 is provided with a flange formed with a series of notches or stops 117, 118, 119, 120, and 121, these notches being adapted to selectively receive the selector arm 111 as the arm is manually manipulated about its pivot 112. In order to prevent accidental displacement of the arm 111 from engagement with any of these notches, the selector arm 111 may have a certain amount of yielding whereby the selector arm is sprung as the arm is lifted from one notch and moved into engagement with another of the notches. When the selector arm 111 is in engagement with the notch 120 the transmission is in neutral so that no drive will be transmitted from engine A to the power take-off shaft 10 and for convenience of reference the notch 120 may be termed as the neutral notch. In a corresponding manner the notch 117 is the first speed notch, the notch 118 is the second speed notch and the notch 119 may be termed the third or direct speed notch. The notch 121 is the reverse notch, it being understood that when the selector arm 111 is engaged with the reverse notch 121, the transmission will be manipulated under controls which will be presently apparent for driving the power take-off shaft 10 in the reverse direction.

Before describing the means for controlling a supply of fluid under pressure to the passage 108 and the means for axially reciprocating the shaft D, we will describe the operation of the leader valve device E in response to manual manipulation by the selector arm 111. In Fig. 8 the levers 79 and 88 are illustrated in the positions which they occupy when the shaft D is rotated to bring the second speed rack 69 into engagement with the segmental gear 65ᵇ for actuating the second speed braking device 23. Assuming that the parts are in such position with the shaft D moved axially to the left as viewed in Fig. 2 so as to contract the band 26 of the second speed braking device 23, it will be apparent that the forces required to maintain the band in the contracted position will hold the levers 88 and 79 in the position shown in Fig. 8, the gear 86 being also held against rotation. In this manner the rack 90 is also held against axial movement in response to operation of the lever 105 in the following manner. In Fig. 8 (also in Figs. 7 and 9) we have illustrated a number of radial lines respectively designated as 1, 2, 3, N and R, these lines representing the axial position of link 105 when the selector arm 111 is engaged with its notches 117, 118, 119, 120, and 121, respectively. Thus the letter N indicates the neutral position of lever 105, R represents the reverse position thereof, and the numerals 1, 2, and 3 indicates the first, second and third speed positions of lever 105.

In Fig. 8 the lever 105 has been moved from its position indicated by the line 2 to its third speed position indicated by the line 3, the selector arm 111 having been moved from the second speed notch 118 into engagement with the third speed notch 119. During this counterclockwise rotation of lever 105 the rack 90 remains stationary as previously explained, the gear 104 during this movement of lever 105 is given a clockwise rotation by rack 90, such rotation acting through the rack 103 to move the leader valve 95 to the left and into the position illustrated in Fig. 8. In such position it will be apparent that the fluid pressure delivery conduit 108 is placed in registration with the vertical passage 102, the piston valving portion 97 having uncovered the lower end of the passage 102.

When the fluid pressure is admitted to the conduit 108 as will be presently apparent, the fluid pressure passes through the valve passage 100 and thence to the passage 102 and cylinder 94 where the fluid pressure acts on the cylindrical end 92 of the rack 90. Prior to admission of the fluid pressure to the passage 108 the shaft D is preferably moved rearwardly to release the second speed braking device 23. The leader valve 95 is balanced with respect to the action of the fluid pressure which acts on the piston portion 92 to move the rack 90 forwardly or to the left as viewed in Fig. 8. This forward movement of rack 90 performs two functions. First, the rack 90 acts through gear 104 (the lever 105 being held stationary by engagement of the selector arm 111 in the notch 119) to move the leader valve 95 rearwardly or to the right until the piston valving portion 97 again closes communication between the passage 102 and the cylinder 99. Second, the aforesaid forward movement of rack 90 acts through gear 86, lever 88 and link 81 to swing the lever 79 clockwise to rotate the shaft D clockwise as viewed in Fig. 3. In this manner the second speed rack 69 is rotated free from engagement with the second speed segmental gear 65ᵇ thereby releasing the second speed braking device 23 and the third speed rack 70 is rotated into engagement with the third speed segmental gear 49 carried by the lever 45. The parts are then in position for axial movement of shaft D in its forward direction for causing lever 45 to move the cone brake 41 into engagement with the third speed drum 40 in order to establish the third speed or direct drive through the transmission.

From the foregoing illustrative example of adjustment of the leader valve 95 from the second speed position into the third speed position, it will be apparent that with any of the speed ratio controlling devices 22, 23, 24, or 25 in actuation the selector arm 111 may be manipulated into engagement with any of the notches of segment 113 to adjust the lever 105 and the leader valve 95 in advance of a gear ratio change in the transmission C. Thus, a preselection of a gear ratio may be obtained and in any instance the rack 90 will be moved either forwardly or rearwardly an amount corresponding to the manual adjustment of leader valve 95, the latter being returned to the Fig. 7 position when the rack 90 is moved by the fluid pressure. It will therefore be apparent that it is not necessary for adjustment of the selector arm 111 into successive notches of the segment 113. For example, the selector arm 111 may be moved directly from the first speed notch 117 into engagement with the third speed notch 119 in which event the transmission will be adjusted directly from the drive through the first speed braking device 22 to a drive through the third or direct speed braking device 24.

When the selector arm 111 is engaged in the neutral notch 120 the neutral space 71 indicated in Fig. 3 for the shaft D will be brought opposite the segmental gears 65 and 65ᵃ, it being apparent that under such conditions axial movement of the shaft D will not actuate any of the braking devices.

When the operator desires to drive the motor vehicle in reverse, the selector arm 111 is moved into engagement with the reverse notch 121 and such movement acts through the leader valve mechanism E to rotate D to engage the reversing rack 67 thereof with the segmental gear 65.

We will next describe the manually controlled fluid pressure operating means for admitting fluid pressure to the conduit 108 and also for reciprocating the shaft D in order to successively actuate and release the various speed ratio controlling devices 22, 23, 24, and 25 of transmission C.

In Figs. 1 and 2 it will be noted that the transmission is provided with a reservoir or sump 122 for storing a supply of a suitable fluid such as oil. This oil is preferably maintained in the reservoir 122 separate from the oil used for lubricating purposes in the reservoir 123 (see Fig. 3) for lubricating the various parts of the transmission gearing and actuating mechanism illustrated in Fig. 3. However, if desired, the same oil may be used for lubricating the transmission parts and also for the pressure medium adapted to operate the leader valve mechanism E and the shaft D.

Referring now to Fig. 2 the sleeve 19 which is drivingly connected to engine A through the intermediary of the driving clutch member 11 has secured thereto a driving gear 124 meshing with a driven gear 125. The gear 125 is suitably arranged to drive a pump F of any type suitable for placing the fluid medium employed under the desired pressure. Where oil is employed as the fluid pressure medium we may arrange the pump F for placing the oil under a pressure of approximately five hundred pounds although obviously this may vary within wide limits depending upon the sizes of the various plungers, pistons, and the like operated by the oil and also by the capacity and power transmitted in any particular transmission system. By driving the pump F directly from the engine A rather than from the mechanism driven thereby, the pump F will operate to maintain the fluid medium under pressure even when the engine is idling, this being a desirable condition in the power transmission system.

The pump F is adapted to draw its working medium from the reservoir 122, the oil being discharged from the pump under the desired pressure through a delivery conduit 126 to a passage 127 formed in the valve casting 128. This casting has branch passages 129 and 130, best seen in Fig. 1, in communication with the passage 127. Controlling the passage of the oil along conduits 129 and 130 is a valve 131 formed with the reduced valving portions 132 and 133 respectively adapted for alignment with the passages 129 and 130 for selectively permitting the oil pressure to pass along the passages.

The valve 131 is yieldingly urged upwardly to the normal position thereof illustrated in Fig. 9 by a spring 134 and the valve has its lower end formed with a longitudinal passage 135 opening downwardly to the aforesaid discharge conduit 109 which extends beyond the valve for discharging the oil back to the reservoir 122. The valve passage 135 extends upwardly and laterally thereof as indicated at 136 so that as illustrated in Fig. 9 when the valve 131 is in its normal upward position, the portion of the passage 130 rearwardly of valve 131 (the valve at such time closing the portion of the passage 130 between the pump F and the valve) is in communication with the return passage 109.

When the valve 131 is in its lowered position as illustrated in Fig. 7 the branch passage 129 is closed by the valve, the branch passage 130 is opened by reason of the reduced valve portion 133, and the valve passage 135 is out of communication with the passage 130 since the entry portion 136 of the passage 135 is lowered below the passage 130.

We prefer to control the reciprocation of valve 131 by a manual means rather than to have the operation of valve 131 automatically responsive to other controls of the mechanism. Thus, the upper end of the valve is extended through the casting 128 for operating engagement with a lever 137 mounted on a rock shaft 138, the rock shaft having secured thereto a second lever 139 connected to a link 140 for pivotal connection at 141 to a bell crank lever 142 pivotally supported at 143 to a bracket 144. This bracket is suitably secured at a convenient point such as to the usual vehicle toe board 145. The bell crank lever 142 is operated by a rod 146 pivotally connected thereto at 147 the rod extending upwardly through the toe board 145 to the foot pedal or button 148, the mechanism between this pedal and the valve 131 comprising the aforesaid manually operating means G.

In Fig. 9 the pedal 148 is shown in its normal upward position with the valve 131 moved upwardly by the influence of spring 134. In Fig. 7 it will be noted that the pedal 148 is shown in its downward or actuated position for lowering the valve 131 into the position illustrated.

Referring particularly to Figs. 7 and 9 we have provided a fluid pressure operating cylinder H open at the upper end thereof to the passage 129 whereby oil pressure from pump F will be delivered to the cylinder H when the valve 131 is in the Fig. 9 position.

Operating within the cylinder H is a piston 149 having a downwardly extending rod structure 150 yieldingly urged downwardly by a spring 151 operating in the cylinder lower extension 152. The spring 151 reacts against a fixed plate 153 through which the piston rod 150 slides, the plate 153 bearing upwardly against a shoulder 154 provided by the cylinder H.

The rod 150 has a transversely slotted opening 155 receiving the forwardly extending end of a lever 156 pivotally carried by a shaft 157, the shaft and lever being connected against relative rotational movement. Secured to shaft 157 is a gear segment 158 meshing with the piece of a rack 159 formed on the shaft D forwardly of the third speed rack 70 as best seen in Fig. 2.

The lever 156 together with the gear segment 158 and the rack 159 provides the means for imparting the reciprocating movement to the shaft D for selectively operating and releasing the various braking devices 22, 23, 24, and 25. In Fig. 7 it will be noted that the lever 156 is shown in its upward swinging movement whereby the shaft D is in its rearward movement of Fig. 2, the braking devices being released for this position of shaft D. In Fig. 9 it will be noted that the lever 156 is in its lowered position having moved the shaft D forwardly for causing operation of one of the braking devices through operation of one of the racks of shaft D in engagement with the corresponding gear segment associated with one of the braking devices.

The upper end of cylinder H adjacent the delivery end of the passage 129 is provided with a port 160 normally establishing communication between cylinder H and a surge chamber or passage 161. The surge chamber 161 extends upwardly from the port 160 so as to store a quantity of oil displaced by upward movement of the piston 149 for reentry to the cylinder H during the first part of the downward movement of the piston as will be presently more readily apparent. As best shown in Figs. 2 and 7 the surge chamber 161 has an outlet passage 162 extending through the side wall of the transmission casing, this wall having an opening 163 communicating with the passage 162 so that any excess oil displaced by upward movement of piston 149 will pass from the surge chamber 161 through the passage 162 and opening 163 for delivery into the reservoir 122.

According to the normal position of the parts as illustrated in Fig. 9 the port 160 is closed by a valve 164 yieldingly urged toward port 160 by a spring 165, the valve having a hollow stem 166 communicating with cylinder H by a check valve 167 yieldingly urged upwardly to close the opening 168 of the valve stem 166 by reason of a spring 169. The valve stem 166 has a discharge or pressure relief port 170 for establishing communication between cylinder H and the chamber 161 when the check valve 167 is displaced downwardly from the position thereof illustrated in Fig. 9 to the Fig. 7 position. For controlling the displacement of the check valve 167 we have provided a plunger 171 slidable in the opening 168 of valve stem 166, this plunger having a head 172 normally spaced slightly above the upper end of the valve stem 166 as shown in Fig. 9, the check valve 167 in such instance being seated upwardly to close communication between cylinder H and the surge chamber 161.

Operating against the head 172 is a lever arm 173 pivotally connected at 174 with a link 175, this link extending downwardly for pivotal connection 176 with the aforesaid lever 156. The lever arm 173 has a second lever arm portion 177 extending rearwardly of the pivotal connection 174, the lever arm 177 being pivotally connected at 178 with a piston valve 179 slidably guided in a cylinder 180. The cylinder 180 has its lower end in communication with the aforesaid oil pressure delivery conduit or passage 130 whereby the oil pressure delivered by pump F will, when valve 131 is raised to the Fig. 7 position, enter the cylinder 180 and act to move the piston valve 179 upwardly in the cylinder 180. The cylinder 180 has a lateral port 181 in communication with the aforesaid passage 108, the arrangement being such that the lower end of the piston valve 179 is normally spaced below the port 181 as shown in Fig. 9. When the piston valve 179 is in its uppermost position as illustrated in Fig. 7 it will be apparent that the piston valve has uncovered the port 181 so as to establish communication between the oil pressure delivery conduit 130 and the passage 108 extending to the leader valve mechanism E.

In operation of the power transmission mechanism as thus far described we will describe the operation of the mechanism between a typical speed ratio change as a change from the second speed to the third speed by way of example. Let it be presumed that the motor vehicle is being driven in the second speed with the selector arm 111 in engagement with the second speed notch 118 of the segment 113. Under such conditions of drive the pedal 148 will be in its upward position of Fig. 9 and the valve 131 will be raised by the spring 134 into the Fig. 9 position thereby causing the pump F to deliver fluid pressure through the branch passage 129 to the cylinder H, the branch passage 130 being closed by the valve 131 according to the position of these parts as illustrated in Fig. 9. Thus, the piston 148 being in its downward position under the influence of spring 151 and the fluid pressure above the piston, the lever 156 is lowered and the gear segment 168 and rack 169 will hold the shaft D in the forward position. With the drive taking place in the second speed ratio, the forward position of shaft D has caused the second speed rack 69 to operate through the gear segment 65$^b$ to contract the brake band 26 of the second speed braking device 23 thereby causing the drive to take place through the transmission in the second speed ratio.

From Fig. 9 it will also be apparent that the piston valve 179 is in its lowermost position and the fluid pressure in cylinder H will hold the valve 164 against the port 160. The head 172 of plunger 171 is slightly spaced above the stem 166 of valve 164 permitting the spring 169 together with the fluid pressure in cylinder H to hold the check valve 167 against its seat for closing communication between cylinder H and the surge chamber 161.

With the drive taking place in the second speed ratio and prior to movement of the selector arm 111 it will be apparent that the levers 88 and 79 will occupy the positions illustrated in Fig. 8 although the lever 105 will lie in the direction of the radial line 2 and the leader valve 95 will occupy its normal position illustrated in Figs. 7 and 9 wherein the piston valving portions 96 and 97 close the lower ends of the passages 101 and 102.

With the parts in the positions described the motor vehicle may be driven as long as desired in the second speed ratio. For purposes of illustration let it be presumed that the vehicle driver desires to manipulate the transmission mechanism into the third speed or direct drive for the motor vehicle. In order to effect this change in the driving speed ratio, the driver first moves the selector arm 111 from engagement with the second speed notch 118 into engagement with the third speed notch 119, this being the position of the selector arm as illustrated in Fig. 1. This movement of the selector arm 111 will operate the leader valve 95 into its position illustrated in Fig. 8 according to the foregoing detailed description of the operation of the leader valve, it being apparent that the rack 90 will be fixed against movement since the fluid pressure is still operating in cylinder H against the piston 149 to hold the shaft D in its forward position. Thus, we have provided a preselector arrangement whereby the selector arm 111 may be adjusted into a new position of transmission control in advance of a change taking place in the transmission.

At such time as the vehicle driver desires the change from the second speed ratio into the third or direct speed ratio to take place, he momentarily depresses the pedal 148 with his foot and the fluid pressure operating mechanism responds as follows. Depressing the pedal 148 moves the valve 131 downwardly from the Fig. 9 into the Fig. 7 position thereby closing the branch passage 129 and opening the branch passage 130 to the cylinder 180. The fluid pressure thus acts on the piston valve 179 to move the piston valve upwardly. The fluid pressure trapped in cylinder H above the piston 149 will initially prevent the piston 149 from moving upwardly when the branch passage 129 is closed so that the lever arm 173 will move downwardly about the pivotal point 174 as a fulcrum to cause the head 172 to move downwardly against the stem 166, the plunger 171 thereby unseating the check valve 167 to relieve the pressure of the oil above the piston 149.

Continued upward movement of the piston valve 179 causes further downward movement of the swinging arm 173 and, since the relatively high oil pressure in cylinder H has been relieved through the discharge port 170, the plunger head 172 moves downwardly as a unit with the valve stem 166 causing the valve 164 to move away from the port 160 against the action of spring 165. At this time of the operating cycle the piston valve 179 has moved upwardly but has not yet uncovered the port 181 for causing operation of the leader valve 95. When the valve 164 has been unseated as aforesaid continued upward movement of the piston valve 179 will cause the lever portions 173 and 177 to swing upwardly about the forward end of the lever portion 173 as a fulcrum inasmuch as at such time the lever arm 173 has moved downwardly to its limiting position determined by engagement of the head 172 against the upper face of a bushing 182. As the lever arms 173 and 177 swing upwardly as a unit about the head 172 as a fulcrum point, it will be apparent that the pivot 174 will be swung upwardly causing link 175 to also move upwardly.

This upward movement of link 175 will act to swing the lever 156 upwardly about the axis of the pivotal supporting shaft 157 for moving the piston 149 upwardly in cylinder H and compressing the spring 151. Simultaneously therewith the segmental gear 158 will be rotated clockwise as viewed in Figs. 7 and 9 to act on rack 159 for moving the shaft D rearwardly to release the second speed braking device 23.

As the piston 149 moved upwardly as aforesaid the fluid above the piston will be displaced past the valve 164 and port 160 into the surge chamber 161, any excess fluid passing through the passage 162 and opening 163 for discharge into the reservoir 122. However, an appreciable volume of the oil will be stored in the surge chamber 161 for reentry into the cylinder H as will be presently apparent.

During the latter part of the upward swinging movement of the lever arms 173 and 177 to raise the piston 149, the piston valve 179 will move upwardly to the limit of its travel thereby uncovering the port 181 and causing the fluid pressure from passage 130 to enter the passage 108. This fluid pressure then acts on the leader valve 95 as hereinbefore described in detail to move the leader valve from the Fig. 8 position into the position thereof shown in Fig. 9. This movement of the leader valve causes adjustment of the rack 90 whereby the lever 88 together with the lever 79 is moved from the second speed position thereof illustrated in Fig. 8 into the third speed position shown in Fig. 7. While the entire cycle of gear change preferably takes place in a relatively small amount of time such as a fraction of a second, the leader valve mechanism E does not respond to the upward movement of the piston valve 179 as quickly as the upward movement of piston 149 so that by the time the lever 88 is swung by the rack 90 into its new position in response to return of leader valve 95, the piston 149 has moved upwardly to the limit of its travel for operating the shaft D to its rearward position. Thus, when the rack D is rotatably adjusted in response to a swinging movement of lever 88 to bring the third speed rack 70 into alignment with the third speed gear segment 65, the second speed braking device 23 has been fully released.

The operation as thus far described includes the changes which take place in the fluid pressure operating mechanism when the pedal 148 is depressed from the Fig. 9 position into its position illustrated in Fig. 7. Such operation has released the second speed braking device in the foregoing assumed illustration and also has rotatably adjusted the shaft D to bring the third speed rack 70 into alignment with the third speed gear segment 49, the lever 45 being therefore ready for swinging operation when the shaft D is returned to its forward position for operating the third speed braking device 24.

When the operator releases the pedal 148, the valve 131 will be restored to its normal upward position under the influence of spring 134, closing off the branch passage 130 from communication with the cylinder 180 and again opening the branch passage 129 to the cylinder H. As soon as the fluid pressure has been cut off from the cylinder 180, the spring 151 acts to move the piston 149 downwardly, the oil stored in the surge chamber 161 quickly flowing into the cylinder H above piston 149. Such arrangement avoids the necessity for the pump F to supply sufficient oil to the cylinder H to produce the desired displacement of piston 149, the pump F mainly being called upon to build up the pressure in the cylinder H after the fluid in the surge chamber 161 has been drawn into the cylinder H pursuant to downward movement of piston 149. Such arrangement materially reduces the time necessary for completion of the cycle of the fluid pressure operating mechanism.

The lever 156 follows the piston 149 in its downward movement, the link 175 acting on the lever portion 173 to swing the lever arms 173 and 177 downwardly about the head 172 as a fulcrum, the piston valve 179 moving downwardly in the cylinder 180. The oil displaced by the downward movement of the piston valve returns to the reservoir 122 by reason of the passages 136, 135 in the valve 131.

As the lever 156 moves downwardly it will be apparent that the gear segment 158 will rotate counterclockwise causing the rack 159 to move forwardly. Inasmuch as the valve 164 will be seated by the spring 165 immediately after the fluid in the surge chamber 161 enters the cylinder H, the fluid pressure in cylinder H will rapidly build up under delivery of oil from the pump F and the piston 149 will then operate under the combined influence of the oil pressure and the action of spring 151 to cause the third speed rack 70 to move forwardly with the shaft D to swing the lever 45 and thereby operate the third speed braking device 24. It will also be apparent that the fluid pressure building up in cylinder H will cause the check valve 165 to seat and to thereby restore the plunger 171 to the normal position illustrated in Fig. 9. While the check valve 167 may be seated during the latter part of the downward movement of piston 149, the fact that the check valve 167 may be unseated during the initial downward movement of the piston will not materially prevent the desired rapid building up of the oil pressure in cylinder H inasmuch as the delivery of pump F is adequate to build up the pressure more rapidly than the tendency for the fluid pressure to fall off past the check valve 167.

We have described a complete cycle of operation of the power transmission mechanism, it being apparent that a similar cycle takes place whenever the vehicle operator manipulates the selector arm 111 from one of the notches of segment 113 to another position of control followed by a momentary actuation of the pedal 148. It will furthermore be apparent that it is not necessary for the vehicle driver to follow the sequence of the notches of segment 113 since the selector arm 111 may be moved directly from engagement with one of the notches thereof into another notch remotely spaced from the position of initial engagement. Thus, by way of example, when the selector arm 111 is engaged with the neutral notch 120, the operator may move the selector arm directly into engagement with the second or third speed notches 118 or 119 respectively.

When the selector arm 111 is moved into engagement with the neutral notch 120 followed by a momentary depression of the pedal 148, the shaft D is thereby moved rearwardly to release any of the braking devices which may have been in operation, the forward movement of the shaft D being free from operating engagement with any of the braking devices through the provision of the neutral space 71 referred to in detail hereinbefore.

When the operator desires to drive the motor vehicle in reverse, he adjusts the selector arm 111 into engagement with the reverse notch 121 of segment 113 and, when the pedal 148 is momentarily depressed, the cycle of operation of the fluid pressure mechanism will be apparent from the specific example given above, the reverse rack 67 in such instance operating through the reversing gear segment 65 to operate the reverse speed ratio controlling device 25.

In order to limit rotation of the various screw shafts 60, 60ª, and 60ᵇ when the shaft D is operated rearwardly in releasing the respective braking devices 25, 22, and 23 and to thereby maintain proper alignment for entry of the teeth of racks 67, 68, and 69 with the respective segmental gears 65, 65ª, and 65ᵇ, each of the aforesaid screw shafts is provided with an upward extension 183 illustrated in Figs. 3 and 4. Secured to the side cover 50 by fasteners 184 is a bracket 185 provided with a series of longitudinally spaced openings 186 through which the respective projections 183 extend. In Fig. 4 the splines 187 between the bracket 52 and the various nuts 56 are also illustrated. During the rearward releasing movement of shaft D, whichever of the screw shafts 60, 60ª or 60ᵇ is engaged with shaft D is rotated substantially ninety degrees to position the shaft extension 183 in the limiting releasing position as shown in Fig. 4. When either of the screw shafts is operated by forward movement of shaft D so as to rotate any of the screw shafts in a clockwise direction as viewed in Fig. 4, the projection 183 of such screw shaft is rotated through substantially ninety degrees within the associated opening 186 of the bracket 185. In this manner proper alignment is maintained between the racks 67, 68, and 69 with the teeth of the associated segmental gears 65, 65ª, and 65ᵇ respectively.

In order to prevent any possibility of the shaft D being moved forwardly to engage more than one of the racks thereof with the respectively associated segmental gears for operating the various braking devices, and also for maintaining the desired alignment of the shaft D with respect to the associated segmental gears operated thereby we have provided the mechanism illustrated in Figs. 5 and 6. The shaft D has a bearing portion adjacent the forward end of the circular rack 73, this bearing portion being slidable through a fixed bushing 188 formed with a series of circumferentially spaced, longitudinally extending rearwardly opening slots 189, 190, 191, 192, and 193. These slots respectively and selectively receive the end 194 of a pin 195 fixed within a transversely extending opening 196 of the shaft D.

In Figs. 5 and 6 the pin end 194 is illustrated in alignment with the third speed slot 191 corresponding to the position of shaft D illustrated in Fig. 2. When the shaft D is moved forwardly as viewed in Fig. 2 or to the right as viewed in Fig. 6, the pin end 194 will move in the slot 191, the bushing 188 having been previously adjusted with respect to shaft D so that the various slots of bushing 188 will assure the proper alignment of shaft D and to also prevent forward movement of the shaft unless the pin end 194 is properly aligned with one of the slots of the bushing 188. In this manner forward movement of shaft D is prevented in the event that the shaft is not properly adjustably rotated by the leader valve selecting mechanism E.

When the shaft D is rotated into its position for actuating the first speed braking device 22 the pin end 194 will be aligned with the first speed slot 189 of the bushing 188. In similar manner the slot 190 is the second speed slot, slot 192 is the neutral slot, and slot 193 is the reverse slot as will be readily understood.

The rearwardly extending faces 198 of bushing 188 between adjacent slots thereof is preferably sloped circumferentially and forwardly toward the adjacent slots to guide the pin end 194 into the proper slots of bushing 188 in the event that the shaft D is slightly misaligned from the slot.

In Fig. 6 the shaft D is illustrated in the rearmost position of movement determined by the screw shaft projection 183 and the associated bracket 185, a relatively small amount of clearance 197 being provided between the pin end 194 and the rearwardly extending faces of the bushing 188 between the adjacent slots. The clearance 197 is sufficient to permit rotary adjustment of shaft D in its released position in response to the leader valve selecting mechanism E, the clearance 197 representing substantially the forward movement of shaft D in taking up the clearance between the brake band 26 of any of the braking devices and the rotary drum associated therewith.

Various modifications and changes will be apparent from the teachings of our invention, as set forth in the appended claims and it is not our intention to limit our invention to the particular details of construction and operation shown and described for illustrative purposes.

What we claim is:

1. In a motor vehicle transmission having a plurality of speed ratio controlling braking devices, means operably associated with each of said controlling devices for actuating said braking devices, an adjustable rack shaft adapted for selective operative connection with said actuating means for operating said braking devices, manually operated means for selectively adjusting said rack shaft, and power operating means for actuating said rack shaft to apply a braking force to said actuating means.

2. In a motor vehicle transmission having a plurality of speed ratio controlling devices, means operably associated with each of said controlling devices for actuating said devices, an adjustable shaft having a plurality of racks respectively adapted for selective operative connection with said actuating means for said controlling devices, manually operated means for adjusting said shaft for selectively operably connecting said racks respectively with said actuating means, and power operating means for actuating said shaft.

3. In a motor vehicle transmission having a plurality of speed ratio controlling devices, means operably associated with each of said controlling devices for actuating said devices, an adjustable shaft having a plurality of racks respectively adapted for selective operative connection with said actuating means for said controlling devices, manually operated means for rotating said shaft for selectively operably connecting said racks respectively with said actuating means, and power operating means for axially actuating said shaft.

4. In a motor vehicle transmission having a plurality of speed ratio controlling devices, means operably associated with each of said controlling devices for actuating said devices, an adjustable shaft having a plurality of racks respectively adapted for selective operative connection with said actuating means for said controlling devices, manually operated means for rotating said shaft for selectively operably connecting said racks respectively with said actuating means, and power operating means for reciprocating said shaft.

5. In a motor vehicle transmission having a plurality of speed ratio controlling devices, means operably associated with each of said controlling devices for actuating said devices, an adjustable operating element adapted for selective operative connection with said actuating means for said controlling devices, manually controlled fluid pressure operating selector means for adjusting said operating element selectively to its positions of adjustment subsequently to manual selection of said selector means, and power operating means for alternately actuating and releasing said operating element, said fluid pressure operating selector means acting to adjust said operating element in response to release thereof.

6. In a motor vehicle transmission having a plurality of speed ratio controlling devices, power operated means for selectively operating said controlling devices, and manually operated means for selectively controlling operation of said controlling devices by said power operated means, said manually operated means including a rack shaft adjustable to selectively establish an operating connection between said power operated means and said controlling devices, said rack shaft having a plurality of groups of rack teeth carried thereby for providing said operating connection.

7. In a motor vehicle transmission having a plurality of speed ratio controlling devices, power operated means for selectively operating said controlling devices, and manually operated means for selectively controlling operation of said controlling devices by said power operated means, said manually operated means including a rack shaft adjustable to selectively establish an operating connection between said power operated means and said controlling devices, said rack shaft having a plurality of groups of rack teeth carried thereby for providing said operating connection, said power operated means acting through said rack shaft to selectively operate said controlling devices by said groups of rack teeth.

8. In a motor vehicle transmission having a plurality of speed ratio controlling devices, power operated means for selectively operating said controlling devices, an adjustable element adapted to selectively establish an operating connection between said power operated means and said controlling devices, and manually controlled fluid pressure operating selector means for adjusting said adjustable element selectively to its positions of adjustment subsequently to manual selection of said selector means.

9. In a motor vehicle planetary transmission having a plurality of speed ratio planetary gear trains and rotary controlling drums associated therewith, braking means for resisting rotation of each of said drums, means operably associated with each of said braking means and adapted to actuate the respective braking means, an adjustable rack shaft adapted for selective operative connection with said actuating means, manually operated means for selectively adjusting said rack shaft, and power operating means for actuating said rack shaft.

10. In a motor vehicle planetary transmission having a plurality of speed ratio planetary gear trains and rotary controlling drums associated therewith, braking means for resisting rotation of each of said drums, means including a gear associated with each of said braking means and adapted to actuate the respective braking means, an adjustable shaft having a plurality of racks respectively adapted for selective operative connection with said actuating means, manually operated means for rotatably adjusting said shaft to selectively engage said racks with said gears respectively, and power operating means for alternately reciprocating said shaft to selectively actuate and release said braking means.

11. In a motor vehicle planetary transmission having a plurality of speed ratio planetary gear trains and rotary controlling drums associated therewith, braking means for resisting rotation of each of said drums, means operably associated with each of said braking means for actuating said braking means, an adjustable operating element adapted for selective operative connection with said actuating means, manually controlled fluid pressure operated means for selectively adjusting said operating element, said fluid pressure means including a leader valve, and power operating means for actuating said operating element.

12. In a motor vehicle planetary transmission having a plurality of speed ratio planetary gear trains and rotary controlling drums associated therewith, braking means for resisting rotation of each of said drums, a shaft for each of said braking means, each of said shafts having oppositely threaded portions, means threadedly connected to said threaded portions of each of said shafts and adapted on rotation of said shafts to actuate the braking means respectively associated therewith, power operating means for actuating said shafts, and manually operated means for selectively controlling actuation of said shafts by said power means.

13. In a motor vehicle planetary transmission having a plurality of speed ratio planetary gear trains and rotary controlling drums associated therewith, braking means for resisting rotation of each of said drums, a shaft for each of said braking means, each of said shafts having oppositely threaded portions, means threadedly connected to said threaded portions of each of said shafts and adapted on rotation of said shafts to actuate the braking means respectively associated therewith, a gear carried by each of said shafts, an adjustable rack shaft adapted for selective operable connection to said gears, manually controlled selector means for selectively adjusting said rack shaft, and power means for actuating said rack shaft in its positions of adjustment for selectively operating said braking means.

14. In a motor vehicle transmission having a plurality of speed ratio controlling devices, means operably associated with each of said controlling devices for actuating said devices, an adjustable reciprocatory operating element adapted for selective operative connection with said actuating means for said controlling devices, manually controlled means for selectively adjusting said operating element, fluid pressure operating means for actuating said operating element by fluid pressure force application in each direction of reciprocation of said operating element, and means for controlling fluid pressure supply to said fluid pressure operating means.

15. In a motor vehicle transmission having a plurality of speed ratio controlling devices, means operably associated with each of said controlling devices for actuating said devices, an adjustable operating element adapted for selective operative connection with said actuating means for said controlling devices, manually controlled means for selectively adjusting said operating element, a cylinder, a piston operating in said cylinder, means operably connecting said piston and said operating element, means for admitting a fluid under pressure to said cylinder for causing said piston to actuate said operating element in one direction of movement thereof, and fluid pressure means for restoring said piston to thereby actuate said operating element in a direction substantially opposite to that aforesaid.

16. In a motor vehicle transmission having a speed ratio controlling device, a fluid pressure receiving cylinder, a piston operating in said cylinder, means actuated by said piston during the working stroke thereof for operating said controlling device, means for supplying fluid under pressure to said cylinder, and means including a chamber adapted to receive fluid from said cylinder during the return stroke of said piston and to return said fluid to said cylinder during the said working stroke of the piston, and means for operating said piston on its said return stroke.

17. In a motor vehicle transmission having a speed ratio controlling device, a cylinder having a fluid pressure receiving space, means including a piston operating in said space for actuating said controlling device, means for supplying fluid pressure to said space to operate said piston, and means for accelerating the pressure rise in said cylinder space over the pressure rise produced by said fluid pressure supply, said last named means including a force applying element operably connected to said piston throughout the fluid pressure stroke thereof.

18. In a motor vehicle transmission having a plurality of speed ratio controlling devices, means operably associated with each of said controlling devices for actuating said devices, an adjustable operating element adapted for selective operative connection with said actuating means for said controlling devices, manually operated means for selectively adjusting said operating element, power operating means for actuating said operating element, and means for adjusting said operating element to supplement the adjustment thereof by said manually operated means whereby to compensate for misalignment in the operative connection between said operating element and the actuating means for said controlling devices.

19. In a motor vehicle planetary transmission having a plurality of speed ratio planetary gear trains and rotary controlling members associated therewith, a brake for each of said members, brake applying means for each of said brakes, an adjustable operating shaft adapted to be selectively operably connected to said brake applying means for applying said brakes, said operating shaft extending generally longitudinally of the transmission adjacent said brake applying means, manually controlled means for selectively adjusting said operating shaft to provide said selective operative connection with said brake applying means, and power applying means for operating said shaft in its said positions of selective adjustment whereby to transmit braking force selectively to said brakes.

20. A transmission according to claim 19 wherein said operating shaft is provided with a plurality of groups of teeth adapted to provide said selective operative connection with said brake applying means.

21. A transmission according to claim 19 wherein said operating shaft is provided with a plurality of groups of teeth adapted to provide said selective operative connection with said brake applying means, said groups of teeth being spaced from each other longitudinally and circumferentially of said operating shaft.

22. A transmission according to claim 19 wherein said power applying means includes a fluid pressure operated piston operably connected to said shaft.

23. A transmission according to claim 19 wherein means is provided for supporting and guiding said operating shaft for rotation thereof by said manually controlled means and for axial movement by said power applying means.

24. A transmission according to claim 19 wherein means is provided for supplementing said manual selective adjustment of said shaft, said supplemental adjusting means being adapted to insure selective operative connection with only one of said brake applying means at any time.

25. A transmission according to claim 19 wherein means is provided to delay the selective adjustment of said shaft in response to selective operation of said manually controlled means.

26. A transmission according to claim 19 wherein said manually controlled means includes a fluid pressure operated leader valve device adapted to delay the selective adjustment of said shaft in response to selective operation of said manually controlled means.

27. In a motor vehicle transmission having a plurality of speed ratio controlling devices, means including an adjustable selector operating member adapted to selectively operate said devices, power applying means for actuating said member in its positions of selective adjustment, and manually controlled means including a fluid pressure operated leader valve mechanism adapted to selectively adjust said member.

28. In a motor vehicle transmission having a plurality of speed ratio controlling devices, means including an adjustable selector operating member adapted to selectively operate said devices, power applying means for actuating said member in its positions of selective adjustment, and manually controlled means including a fluid pressure operated leader valve mechanism adapted to selectively adjust said member, said manually controlled means including a manually controlled mechanism adapted to effect sequential selective adjustment of said member under control of said leader valve mechanism and then actuation of said member by said power applying means.

29. In a motor vehicle transmission having a plurality of speed ratio controlling devices, means including an adjustable selector operating member adapted to selectively operate said devices, fluid pressure operating means including a leader valve mechanism adapted to selectively adjust said operating member, manually operated means adapted to pre-set said leader valve mechanism in advance of said selective adjustment of said member, and fluid pressure operating means adapted to operate said member in its positions of selective adjustment.

30. In a motor vehicle transmission having a plurality of speed ratio controlling devices, means including an adjustable selector operating member adapted to selectively operate said devices, fluid pressure operating means including a leader valve mechanism adapted to selectively adjust said operating member, manually operated means adapted to pre-set said leader valve mechanism in advance of said selective adjustment of said member, a piston valve controlling the supply of fluid pressure to said leader valve mechanism, and fluid pressure operating means adapted to operate said member in its positions of selective adjustment, said fluid pressure operating means including a piston operably connected to said member, and means operably connecting said piston to said piston valve.

31. In a motor vehicle transmission having a plurality of speed ratio controlling devices, means including an adjustable selector operating member adapted to selectively operate said devices, fluid pressure operating means including a leader valve mechanism adapted to selectively adjust said operating member, manually operated means adapted to pre-set said leader valve mechanism in advance of said selective adjustment of said member, a piston valve controlling the supply of fluid pressure to said leader valve mechanism, fluid pressure operating means adapted to operate said member in its positions of selective adjustment, said fluid pressure operating means including a cylinder, a piston in said cylinder adapted to operate said member, means for supplying fluid under pressure to said cylinder, a valve controlling the escape of fluid from said cylinder, and means operably connecting said piston valve with said piston, said connecting means being adapted to operate said valve.

32. In a motor vehicle transmission having a plurality of speed ratio controlling devices, means including an adjustable selector operating member adapted to selectively operate said devices, fluid pressure operating means including a leader valve mechanism adapted to selectively adjust said operating member, manually operated means adapted to pre-set said leader valve mechanism in advance of said selective adjustment of said member, a piston valve controlling the supply of fluid pressure to said leader valve mechanism, fluid pressure operating means adapted to operate said member in its positions of selective adjustment, said fluid pressure operating means including a cylinder, a piston in said cylinder adapted to operate said member, means for supplying fluid under pressure to said cylinder, a valve controlling the escape of fluid from said cylinder, means operably connecting said piston valve with said piston, said connecting means being adapted to operate said valve, a second valve adapted to control the supply of fluid pressure to said cylinder, and means for actuating said second valve subsequently to said pre-setting of said leader valve.

33. In a motor vehicle planetary transmission having a plurality of speed ratio planetary gear trains and rotary controlling drums associated therewith, braking means for resisting rotation of each of said drums, a shaft for each of said braking means, each of said shafts having oppositely threaded portions, means threadedly connected to said threaded portions of each of said shafts and adapted on rotation of said shafts to actuate the braking means respectively associated therewith, an adjustable selector operating element adapted for selective operative connection with said shafts intermediate the threaded portions thereof, power operating means for actuating said selector operating element in its positions of selective adjustment, and manually controlled means for selectively adjusting said selector operating element.

34. In a motor vehicle planetary transmission having a plurality of speed ratio planetary gear trains and rotary controlling drums associated therewith, braking means for resisting rotation of each of said drums, a shaft for each of said braking means, each of said shafts having oppositely threaded portions, means threadedly connected to said threaded portions of each of said shafts and adapted on rotation of said shafts to actuate the braking means respectively associated therewith, power operating means adapted to selectively act on said shafts intermediate the threaded portions thereof for selectively rotating said shafts, and means for selectively controlling the operation of said power operating means on said shafts.

35. In a motor vehicle transmission having a plurality of rotary speed ratio controlling elements, means operatively engageable with each of said rotary elements for effecting a speed ratio drive through the transmission, means including a rack operated pinion operably associated with each of said engageable means for effecting operation thereof, power operating means adapted to selectively actuate said engageable means and including a common selector operating toothed rack member, and means for selectively adjusting said rack member to selectively engage the teeth thereof with said pinions.

36. In a transmission, a brake controlled gear set, a displaceable element having a series of gear teeth, a gear toothed member engageable with the teeth of said element for applying said brake, means for displacing said element to engage teeth of said member and element, and means for applying a braking force to said element.

37. In a motor vehicle transmission having a plurality of speed ratio controlling devices, a cylinder having a fluid pressure receiving space, a piston operable in said space, means operably connected to said piston for selectively operating said devices, manually controlled means for selectively controlling the operation of said devices by said piston operating means, a fluid pressure operated plunger, fluid pressure relief valve means for said cylinder space, means operably connecting said plunger with said piston and with said relief valve means, and valve controlled means for selectively admitting fluid under pressure to said cylinder space and to said plunger.

38. In a motor vehicle transmission having a plurality of speed ratio controlling devices, a cylinder having a fluid pressure receiving space, a piston operable in said space, means operably connected to said piston for selectively operating said devices, manually controlled means for selectively controlling the operation of said devices by said piston operating means, a fluid pressure operated plunger, fluid pressure relief valve means for said cylinder space, means operably connecting said plunger with said piston and with said relief valve means, and manually controlled valving means for selectively supplying fluid under pressure to said cylinder space while venting said plunger and supplying fluid under pressure to said plunger, said plunger when operated by fluid pressure acting through said plunger connecting means to open said relief valve means for venting said cylinder space.

39. In a motor vehicle transmission having a plurality of speed ratio controlling devices, a cylinder having a fluid pressure receiving space, a piston operable in said space, means operably connected to said piston for selectively operating said devices, manually controlled means for selectively controlling the operation of said devices by said piston operating means, a fluid pressure operated plunger, fluid pressure relief valve means for said cylinder space, means operably connecting said plunger with said piston and with said relief valve means, valve controlled means for selectively admitting fluid under pressure to said cylinder space and to said plunger, and a spring yieldingly urging movement of said piston in its direction of fluid pressure actuation.

40. In a motor vehicle transmission having a plurality of speed ratio controlling devices, a cylinder having a fluid pressure receiving space, a piston operable in said space, means operably connected to said piston for selectively operating said devices, manually controlled fluid pressure operated means for selectively controlling the operation of said devices by said piston operating means, a fluid pressure operated plunger, fluid pressure relief valve means for said cylinder space, means operably connecting said plunger with said piston and with said relief valve means, valve controlled means for selectively admitting fluid under pressure to said cylinder space and to said plunger, and plunger controlled means for supplying fluid under pressure to said selectively controlling fluid pressure operated means.

WILLIAM T. DUNN.
AUGUSTIN J. SYROVY.